(12) United States Patent
Aubin et al.

(10) Patent No.: US 12,455,553 B2
(45) Date of Patent: Oct. 28, 2025

(54) REMOTE TERMINAL UNIT PROCESSOR REDUNDANCY SYNCHRONIZATION

(71) Applicant: Schneider Electric Systems, USA Inc., Foxborough, MA (US)

(72) Inventors: Philip Aubin, Kanata (CA); Richard Masson, Rankin Park (AU)

(73) Assignee: SCHNEIDER ELECTRIC SYSTEMS USA, INC., Foxboro, MA (US)

( * ) Notice: Subject to any disclaimer, the term of this patent is extended or adjusted under 35 U.S.C. 154(b) by 487 days.

(21) Appl. No.: 17/557,651

(22) Filed: Dec. 21, 2021

(65) Prior Publication Data
US 2023/0125853 A1    Apr. 27, 2023

Related U.S. Application Data

(60) Provisional application No. 63/271,779, filed on Oct. 26, 2021.

(51) Int. Cl.
*G06F 8/65* (2018.01)
*G05B 19/4155* (2006.01)

(52) U.S. Cl.
CPC .......... *G05B 19/4155* (2013.01); *G06F 8/65* (2013.01); *G05B 2219/31229* (2013.01); *G05B 2219/32404* (2013.01)

(58) Field of Classification Search
CPC ...... G05B 19/4155; G05B 2219/31229; G05B 2219/32404; G06F 8/65; G06F 11/2038; G06F 11/2097; G06F 11/2025; H04L 67/55; H04L 69/04; H04L 69/40
See application file for complete search history.

(56) References Cited

U.S. PATENT DOCUMENTS

| | | | | |
|---|---|---|---|---|
| 5,148,472 A | * | 9/1992 | Freese | ................... H04M 15/88 455/432.3 |
| 2001/0002193 A1 | * | 5/2001 | Fourie | ................ H04Q 11/0478 370/360 |
| 2007/0174601 A1 | | 7/2007 | Douglas et al. | |
| 2010/0199272 A1 | * | 8/2010 | Mahajan | ................. G06F 8/656 717/171 |
| 2021/0176662 A1 | * | 6/2021 | Wang | ...................... H04L 69/04 |

(Continued)

OTHER PUBLICATIONS

J. Stój, "Cost-Effective Hot-Standby Redundancy With Synchronization Using EtherCAT and Real-Time Ethernet Protocols," in IEEE Transactions on Automation Science and Engineering, vol. 18, No. 4, pp. 2035-2047, Oct. 2021, doi: 10.1109/TASE.2020.3031128. (Year: 2020).*

(Continued)

*Primary Examiner* — Thomas C Lee
*Assistant Examiner* — Tyler Dean Hedrick
(74) *Attorney, Agent, or Firm* — Stinson LLP

(57) ABSTRACT

Redundancy synchronization of remote terminal unit (RTU) central processing units (CPUs) associated with an industrial operation includes queuing time-stamped events on a main RTU CPU for transfer to a standby RTU CPU as the time-stamped events are generated on the main RTU CPU (i.e., in real-time). The synchronized RTU CPUs further permit synchronization of logic states and synchronization of firmware upgrades. Synchronization activities occur on the same synchronization communications channel between redundant RTU CPUs.

20 Claims, 5 Drawing Sheets

(56) References Cited

U.S. PATENT DOCUMENTS

2022/0163937 A1* 5/2022 Hsu .................... G05B 19/0426
2022/0225443 A1* 7/2022 Zhu ...................... H04W 76/11
2022/0258644 A1* 8/2022 Hanchett ............ G01C 21/3617
2022/0391116 A1* 12/2022 Liu ...................... G06F 3/0619

OTHER PUBLICATIONS

Search Report from counterpart AE Application No. P6001710/2022, dated Apr. 30, 2025, 2 pages.

* cited by examiner

REMOTE TERMINAL UNIT PROCESSOR REDUNDANCY SYNCHRONIZATION

CROSS-REFERENCE TO RELATED APPLICATION

This application claims priority from U.S. Provisional Patent Application No. 63/271,779, filed Oct. 26, 2021, the entire disclosure of which is incorporated herein by reference.

BACKGROUND

Critical infrastructure often requires the use of duplicated central processing units (CPUs) to increase system availability. Remote terminal units (RTUs) are often used as the control devices. Synchronizing dual RTU CPUs in a way that is transparent to users and covers most RTU data processing use cases is difficult.

The ability to duplicate events, firmware upgrades, and logic states between dual warm-standby RTU controllers, with data state synchronization achieved between these RTU data flows, is desired.

SUMMARY

Aspects of the present disclosure provide extensions to a remote terminal unit (RTU) redundancy protocol for synchronizing events, firmware upgrades, and logic states in warm-standby redundant RTU central processing units (CPUs). These operations occur concurrently on the same synchronization communication channel between redundant RTU CPUs. For instance, the redundancy protocol permits buffered time-stamped event transfer from a main RTU CPU to a standby RTU CPU, corresponding removal of buffered events from the standby RTU CPU, transparent firmware updates to both main to standby RTU CPUs, and efficient, synchronized logic state-data duplication from the main RTU CPU to the standby RTU CPU.

In an aspect, a method for providing redundancy synchronization of RTU CPUs associated with an industrial operation comprises queuing time-stamped events on a main RTU CPU for transfer to a standby RTU CPU as the time-stamped events are generated on the main RTU CPU, receiving the time-stamped events on the standby RTU CPU, and storing the time-stamped events in one or more standby RTU CPU event buffers. The method also includes transmitting the time-stamped events from the main RTU CPU to a Supervisory Control and Data Acquisition (SCADA) controlling station to ensure no data loss in the case of a subsequent transition from the standby RTU CPU to the main RTU CPU and communicating receipt of the time-stamped events from the SCADA controlling station to the main RTU CPU. The method further comprises removing the time-stamped events from the main RTU CPU and the standby RTU CPU event buffers in real-time.

In another aspect, a system provides redundancy synchronization of RTU CPUs associated with an industrial operation. The system comprises a standby RTU CPU and a main RTU CPU. The main RTU CPU executes processor-executable instructions that, when executed, configure the main RTU CPU to generate a plurality of time-stamped events, queue the time-stamped events in a main queue, and transfer the time-stamped events from the main queue to the standby RTU CPU. The standby RTU CPU executes processor-executable instructions that, when executed, configure the standby RTU CPU to receive the time-stamped events and store the time-stamped events in one or more standby RTU CPU event buffers. The main RTU CPU executes processor-executable instructions that, when executed, further configure the main RTU CPU to transmit the time-stamped events to a SCADA controlling station to ensure no data loss in the case of a subsequent transition from the standby RTU CPU to the main RTU CPU and to receive, from the SCADA controlling station, communication of receipt of the time-stamped events by the SCADA controlling station. The time-stamped events are removed from the main RTU CPU and the standby RTU CPU event buffers in real-time after transmitting to SCADA controlling station.

In yet another aspect, a system associated with an industrial operation comprises a SCADA controlling station, a standby RTU communicatively coupled to the SCADA controlling station, and a main RTU also communicatively coupled to the SCADA controlling station. The main RTU CPU executes processor-executable instructions that, when executed, configure the main RTU CPU to generate a plurality of time-stamped events, queue the time-stamped events in a main queue, and transfer the time-stamped events from the main queue to the standby RTU CPU. The standby RTU CPU executes processor-executable instructions that, when executed, configure the standby RTU CPU to receive the time-stamped events and store the time-stamped events in one or more standby RTU CPU event buffers. The main RTU CPU executes processor-executable instructions that, when executed, further configure the main RTU CPU to transmit the time-stamped events to a SCADA controlling station to ensure no data loss in the case of a subsequent transition from the standby RTU CPU to the main RTU CPU and to receive, from the SCADA controlling station, communication of receipt of the time-stamped events by the SCADA controlling station. The time-stamped events are removed from the main RTU CPU and the standby RTU CPU event buffers in real-time after transmitting to SCADA controlling station.

Other objects and features of the present disclosure will be in part apparent and in part pointed out herein.

BRIEF DESCRIPTION OF THE DRAWINGS

Corresponding reference numbers indicate corresponding parts throughout the drawings.

DETAILED DESCRIPTION

Figure 1:
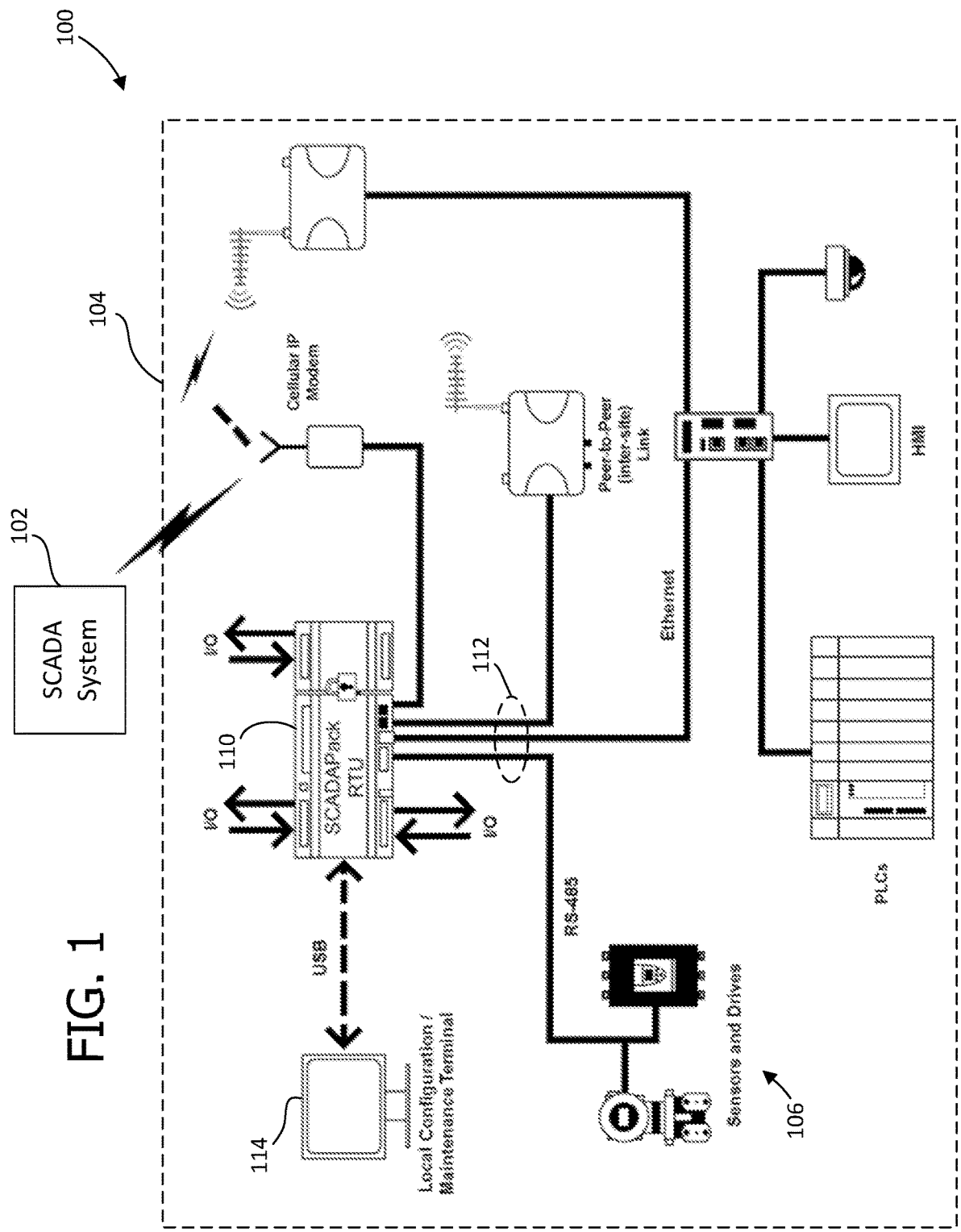
FIG. 1 illustrates a remote terminal unit (RTU) substation of an automation system according to an embodiment.

Referring to FIG. 1, a schematic overview of an automation system is shown 100. In the illustrated embodiment, the automation system 100 includes a Supervisory Control and Data Acquisition (SCADA) system 102 coupled to a remote substation 104 via a communications network, such as a private data radio network and/or a cellular telephone network. The substation 104 includes a number of peripherals 106, including sensors, actuators, drives, and the like. The substation 104 further includes at least one remote terminal unit (RTU) 110 for data acquisition from the substation 104 and/or from the SCADA system 102. In an embodiment, the RTU 110 is used as a control device. A communication bus 112 provides communication for the complete substation 104 and all parts of the substation are accordingly connected thereto, whether directly or indirectly. The RTU 110 is configured to be connected to a computer 114 (e.g., a personal computer, desktop, laptop, workstation machine, etc.) to access and control settings and parameters as well as a real-time database.

The RTU 110 is well-suited for use in oil and gas environments, such as upstream oil and gas production, including gas well heads, oil extraction, and multi-well shale gas well pads. Additional customer use cases in the oil and gas segment include energy optimization, asset age prolongation, production optimization, and 'cradle-to-grave' operation with the same equipment to allow changes in extraction technique using the same control system equipment. Oil and gas segment use cases also include: management of control system and IT equipment, including security configurations, and deployment of trusted application content; and midstream gas transportation including compressor stations and multiple geographies. The functions of RTU 110 in an oil and gas application include: tank monitoring and automation; well test automation; Emergency Shut-Down (ESD) at well heads; well production and optimization; and measurement.

In an oil and gas environment, for example, substation 104 is located at a well site to gather data about various aspects of the well site for monitoring and tracking purposes. The substation 104, which acts as a control unit, includes RTU 110 for collecting data on pump motor operation (e.g., motor speed and load). A variable speed drive motor controller, for example, generates this motor data. The RTU 110 also collects measurements from various wireless and wired field sensors around the well site. These field sensors include a proximity sensor mounted near the crank arm of a rod pump assembly and a load cell mounted between the bridle and polished rod of the rod pump assembly. From this data, RTU 110 can determine the tension or load (vertical axis) on the rod versus the displacement (horizontal axis) of the rod per stroke or pump cycle (i.e., upward and downward movement). Other data collected by RTU 110 from the field sensors may include fluid flow rate, temperature, pressure, and the like.

In an embodiment, RTU 110 is also well-suited for use in the water/wastewater segment, including critical infrastructure pumping stations. Additional customer use cases in the water and wastewater segment include energy optimization for critical infrastructure pumping stations and management of control system and IT equipment including security configurations, and deployment of trusted application content. Examples of water and wastewater functions of RTU 110 include: pump/lift stations; leakage detection; equipment monitoring and control; water quality monitoring; irrigation; managing a District Metering Area (DMA) and/or Pressure Monitoring Area (PMS); and monitoring flow, level, pressure, temperature, etc.

Another use case for the RTU embodying aspects of the present disclosure involves autonomous, remotely located assets, including critical infrastructure assets, where high control system, monitoring, and reporting availability as well as data analytics associated with control systems, asset performance, and custom application features are requested.

Figure 2:
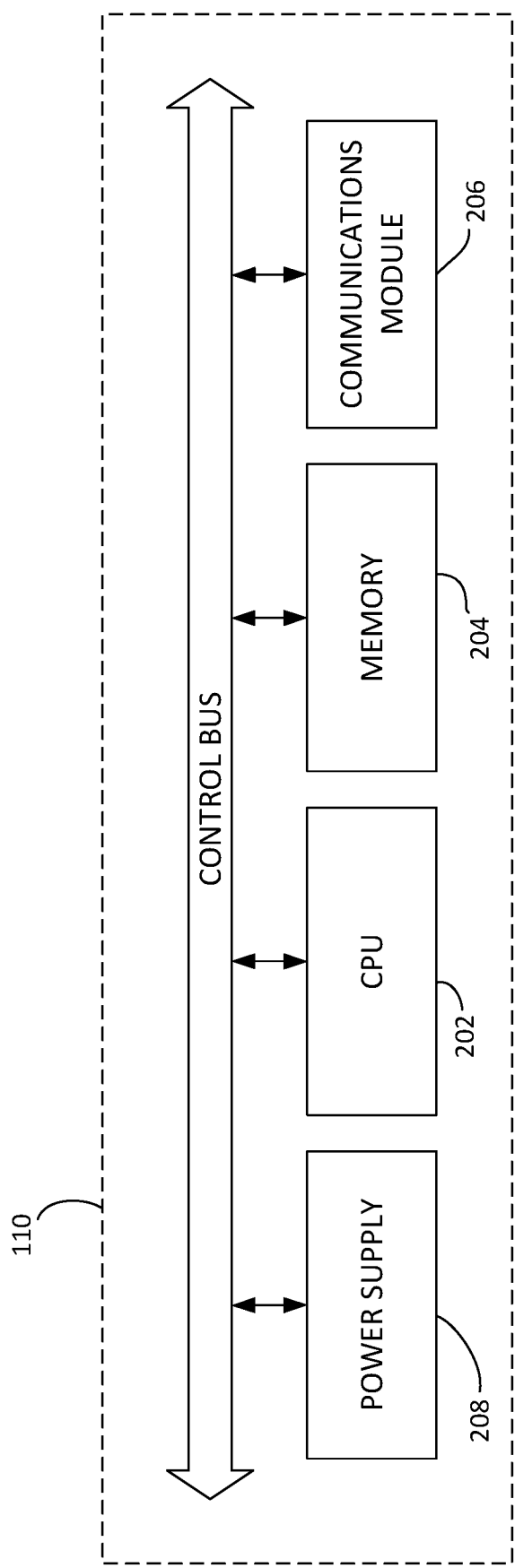
FIG. 2 is a block diagram of the RTU of FIG. 1.

FIG. 2 illustrates RTU 110, including its major components. As shown, RTU 110 includes a central processing unit (CPU) 202, which is the controller module of RTU 110. In addition, RTU 110 includes a memory 204 (e.g., volatile and non-volatile), and a communications module 206 all coupled to a power supply module 208. In an embodiment, the communications module 206 includes a serial port or onboard modem with an I/O (input/output) interface. The RTU 110 is configured to be interfaced to multiple control stations and intelligent electronic devices using different communication media such as RS485, RS232, Ethernet, microwave, satellite, etc. When a communication interface is established, either device can initiate the data transfer. In addition, RTU 110 may include one or more digital input modules providing a plurality of digital inputs, one or more digital output modules providing a plurality of digital outputs, one or more analog input modules providing a plurality of analog inputs, and one or more analog output modules providing a plurality of analog outputs.

Figure 3:
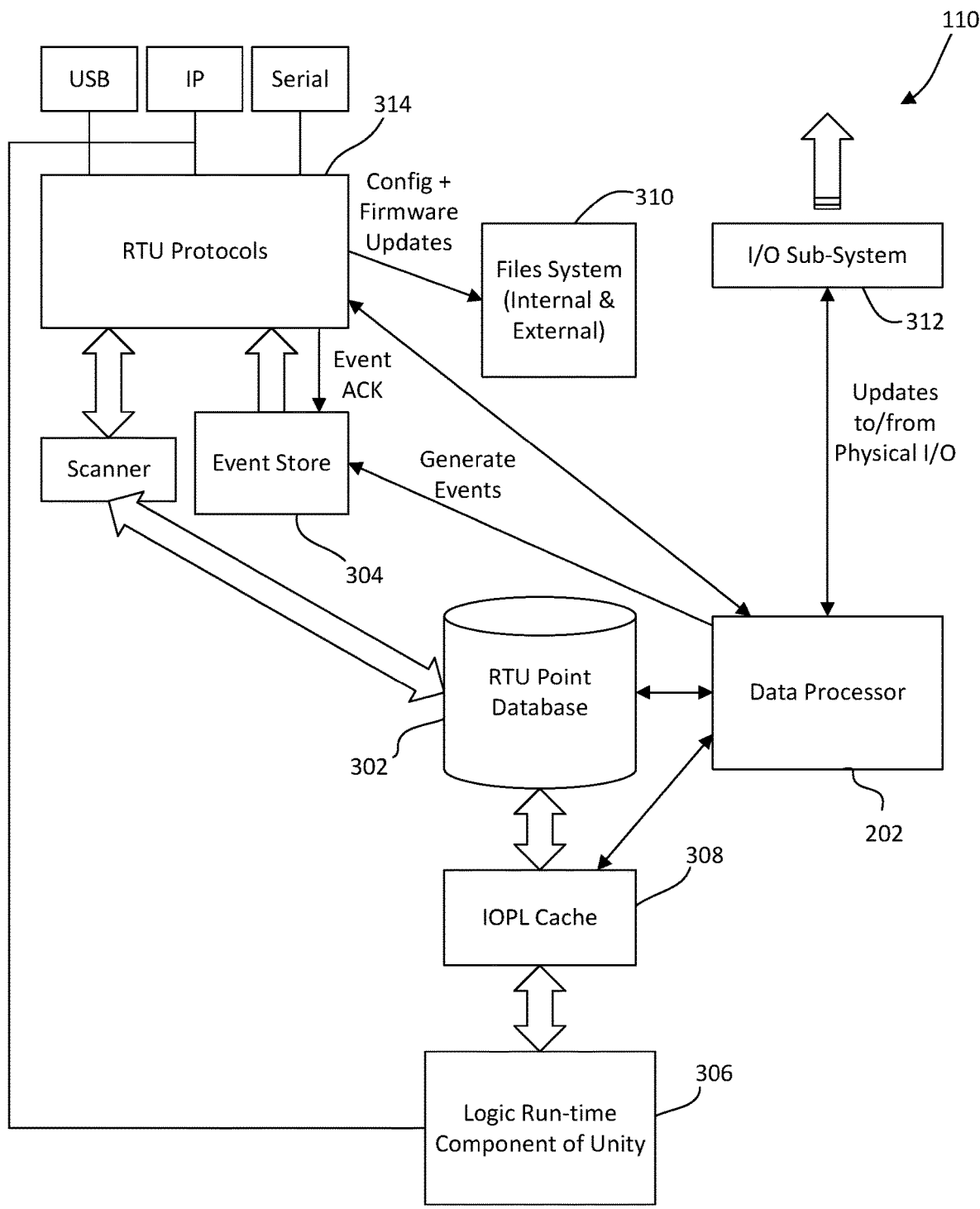
FIG. 3 is a block diagram illustrating services for synchronizing RTU redundant central processing units (CPUs) according to an embodiment.

FIG. 3 illustrates aspects of the internal architecture of RTU 110 according to an embodiment. Components are illustrated for comparison with a redundant architecture as described below. The CPU 202, indicated in FIG. 3 as a data processor, is the central component by which changes to the status of RTU 110 are managed. The RTU 110 includes a point database 302, an event store 304, and a logic run-time component 306 of Unity, and a cache 308 of the IOPL (i.e., Unity I/O process list, which copies instructions for Unity run-time state and end-of-scan data transfers). In the illustrated embodiment, RTU 110 further includes a filesystem 310, an I/O sub-system 312, and a store of RTU protocols 314.

The CPU 202 is responsible for updating the point database 302 based on information from other parts of substation 104, including physical I/O updates from upstream remote protocols via the I/O sub-system 312, local or downstream device data, local run-time logic execution (e.g., using the Unity platform), etc. In an embodiment, the internal systems of RTU 110 manage event storage, with time-stamped data. Events are captured in the event store 304 based on an RTU configuration associated with physical I/O, downstream data sources, and internal data items (including data items coming from Unity run-time 306). Events are reported upstream to client stations through remote protocols 314. Confirmation messages from upstream client stations remove successfully delivered events from the RTU event store 304. The filesystem 310 of the RTU 110 provides storage for delivery of data items such as full or incremental configuration, firmware upgrades, logic applications, etc.

As referred to herein, RTU 110A is RTU 110 when designated as main and RTU 110B is RTU 110 when designated as standby; CPU 202A is CPU 202 when designated as main and CPU 202B is CPU 202 when designated as standby. Critical infrastructure benefits from the use of dual RTU CPUs 202A, 202B to increase system availability. Synchronizing the dual RTU CPUs 202A, 202B in a way that is transparent to users and covers most data processing use cases is difficult. Known redundancy protocols synchronize current values of the RTU point database 302 from a main RTU CPU 202A to a standby RTU CPU 202B (see FIG. 4). The existing mechanism duplicates only one of several data flows (i.e., current data values) of RTUs 110A, 110B. Each RTU 110A, 110B retains a time-stamped history of data state and quality changes that are reported to SCADA controlling stations. Further, each RTU 110A, 110B typically has an IEC 61131-3 logic engine and the ability to upgrade firmware remotely.

Active data to be replicated from the online RTU CPU 202A (main) to the redundant partner CPU 202B (standby) are shown in FIG. 3, namely, configuration and firmware updates, events in event store 304, current data values stored in point database 302, the IOPL cache 308, and the logic run-time component 306 of Unity.

The RTU redundancy services according to an embodiment provide initial synchronization to replicate the configuration and data state of the main CPU 202A onto the standby CPU 202B. Once synchronized, the redundancy services provide on-going transfer of data from main to standby to maintain data synchronization. The IOPL cache 308 is the data interface between the RTU object database 302 and the logic run-time 306. It is updated in the IN phase of each logic scan from RTU database 302, using data from the synchronization of the replicated RTU object database 302 of the standby CPU 202B. On the standby CPU 202B, the normal logic execution and OUT phase writes to IOPL cache 308 are not executed.

Figure 4:
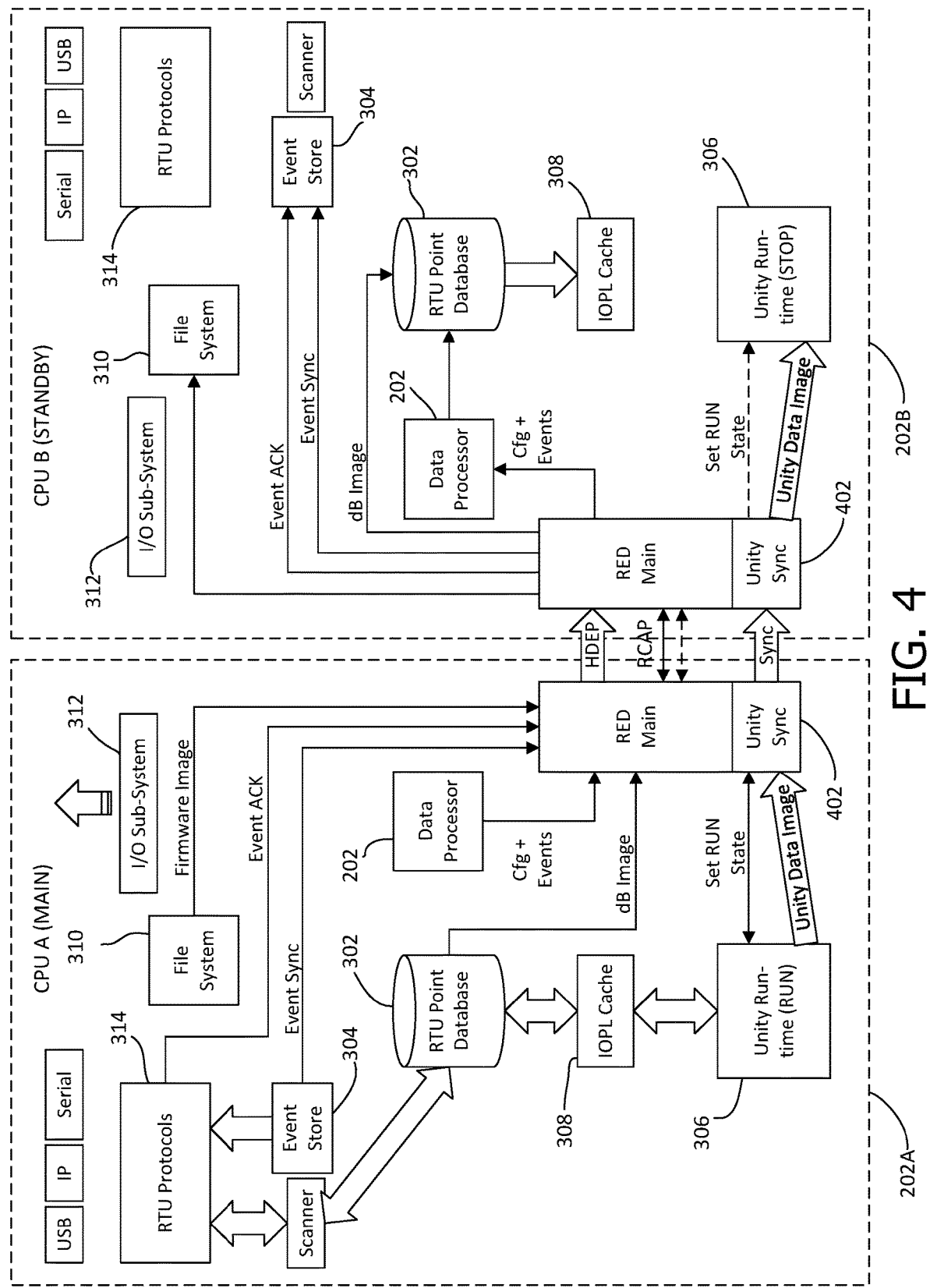
FIG. 4 is a block diagram illustrating an RTU redundancy architecture according to an embodiment.

Referring now to FIG. 4, a redundancy architecture embodying aspects of the present disclosure defines a RED (redundancy management) task architecture, Hot Data Exchange Protocol (HDEP) and Redundancy Control Asymmetric Protocol (RCAP) components, and a synchronization mechanism of the logic run-time component 306 of Unity. FIG. 4 shows the interaction of services associated with redundancy synchronization between the main and standby CPUs 202A, 202B in a redundant RTU system. The component synchronizing the logic redundancy in the RTU architecture, referred to as UnitySync 402 in this embodiment, is managed in the context of "RED" RTU redundancy management tasks and HDEP.

In this particular example, CPU A indicates RTU 110A in the main state and CPU B indicates RTU 110B in the standby state. Alternatively, CPU A could be in the standby state and CPU B could in the main state, in which case operation of the two systems would be mirror-image compared with the architecture shown in FIG. 4. In an embodiment, the data flow for most system services is from the main RTU CPU 202A to the standby RTU CPU 202B to keep the standby synchronized with data changes occurring on the main CPU.

Aspects of the present disclosure provide extensions to an RTU redundancy protocol for duplicating events, firmware upgrades, and logic states between dual warm-standby RTU controllers, with data state synchronization achieved between these RTU data flows. The extensions add protocol definitions and data flows for synchronization of these time-stamped events, for multi-protocol reporting, in real-time, between the main and standby RTU CPUs 202A, 202B. RTU logic controls automation processes from the main RTU CPU 202A for control of a physical process. The extensions also add synchronization and coordination of logic states, in real-time, between the main and standby RTU CPUs 202A, 202B using the same protocol.

In an embodiment, firmware upgrades are deployed by a system administrator, from time to time, to the main RTU CPU 202A. The extensions also transport firmware updates to the standby RTU CPU 202B and coordinate the upgrade sequence for the standby and main CPUs 202A, 202B for a transparent system upgrade. These operations occur concurrently on the same synchronization communication channel.

Time-stamped events are queued for transfer on the main RTU CPU 202A, in real-time, as they are generated. The standby RTU CPU 202B receives the events and inserts them into event buffers (in the same way as the main RTU CPU 202A). A subsequent transition of the standby RTU CPU 202B to the main RTU CPU 202A has the same events buffered on the main CPU 202A ready for seamless transfer to the SCADA controlling station, with no data loss. The corresponding removal of buffered events from the standby RTU CPU 202B, occurs in real-time, as SCADA controlling station confirmations are received and removed from the main RTU CPU 202A.

Firmware updates to the RTU 110 are sequenced between the main and standby RTU CPUs 202A, 202B. The standby RTU 110B is the first of the CPU pair to have its firmware updated. In an embodiment, the main to standby data synchronization is triggered and the standby RTU CPU 202B to the main RTU CPU 202A change-over occurs, and is followed by a final update of the second RTU CPU's firmware. This multi-part, multi-device sequence is seamless to the user.

Logic state data images are synchronized between the main RTU CPU 202A and the standby RTU CPU 202B starting with a snapshot of the logic state image on the main RTU CPU 202A at the end of the IEC 61131-3 logic scan. The logic state data image is compressed and transferred to the standby RTU CPU 202B. The standby CPU 202B receives, decompresses, and deploys the logic data image, synchronized with other data and event updates from the main RTU CPU 202A. The logic of standby RTU CPU 202B is ready to activate with the updated data image, within the timing of one scan on the logic of main RTU CPU 202A.

All of the synchronization activities occur between the main and standby RTU CPUs 202A, 202B with communication using IEEE 802.2 Ethernet SNAP frames transferring private protocol formats. In the present embodiment, SNAP frames are a variant of Ethernet data link frames and in the redundancy system are used for efficient transfer to minimize standby to main change-over delays, and to operate independently of most network data processing.

Aspects of the present disclosure provide: buffered time-stamped event transfer from main to standby RTU CPUs 202A, 202B; corresponding removal of buffered events from the standby RTU CPU 202B; transparent firmware update to both the main to standby RTU CPUs 202A, 202B; and efficient, synchronized logic state-data duplication from the main RTU CPU 202A to the standby RTU CPU 202B.

Figure 5:
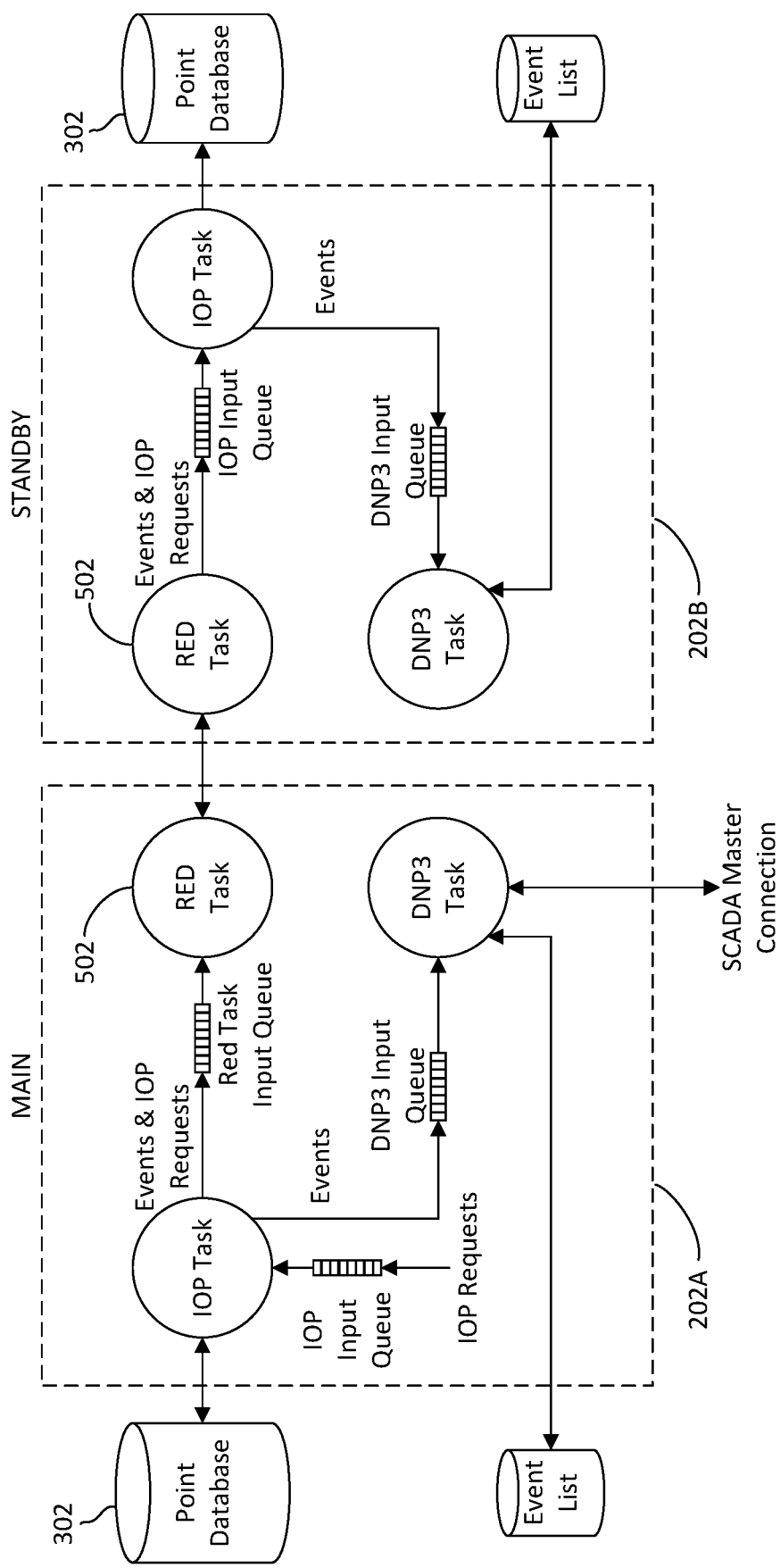
FIG. 5 is a block diagram illustrating an RTU redundancy task architecture according to an embodiment.

Referring now to FIG. 5, the RTU "RED" task pair 502 on the partner CPUs are responsible for distributing data to keep RTU sub-systems synchronized. Snapshots of the object database image and event store are transferred by the main CPU 202A to a previous offline standby CPU 202B upon startup or resynchronization. The HDEP protocol refers to this as the HDEP Integrity stage. After the snapshot transfers start, changes to the configuration of point database 302 and real time data values (including events) are queued on the main CPU 202A and transferred to the queue on the standby CPU 202B. Delta changes continue to be queued through the synchronization phase. The logic run-time component of Unity internal time base is synchronized from the main CPU 202A to the standby CPU 202B. A logic application APX file is transferred by the main CPU 202A to the standby CPU 202B as part of the Integrity stage.

A snapshot of the logic data image from NVRAM is transferred by the main CPU 202A to the standby CPU 202B as part of the integrity stage. When the data image is received on the partner, the logic application is readied for execution but remains in STOP state on the standby RTU 110B. This should be one of the final steps in the HDEP integrity stage to minimize disruption to logic execution on the main CPU. The new partner CPU, i.e., standby CPU 202B, is deemed "Synchronized" and enters a standby state when the logic application and logic data image is received and readied on the standby RTU 110B and the RED queue on the standby CPU 202B is empty. On-going changes for all data types (database, events, logic data image) are queued from the main to standby CPUs 202A, 202B to keep the standby RTU systems synchronized. Event ACKs received via remote protocols 314 on the main RTU 110A remove events from the event store 304 on the main. Information regarding event removal is sent to standby CPU 202B to remove the same events on the standby RTU 110B.

Referring now to FIG. 5, Real Time Clock (RTC) synchronization is managed by RED tasks 502. The standby CPU 202B may also be synchronized using other means (e.g., NTP). In this case the RED time update from the main CPU 202A is ignored (although the intent is that both CPUs 202A, 202B must set time from the same source). The logic run-time component internal time base synchronization is managed by the RED tasks 502. Close synchronization (scan by scan) is necessary to ensure that a transition of the standby CPU 202B to the main CPU 202A performs a bump-less Warm Start on the logic application, with a consistent internal time base (for timing operations such as Timer Elementary Function Blocks, Sequential Function Chart state timing, etc.).

In the STOP state, the logic run-time component of Unity on the standby CPU 202B continues to run the IN phase and INTER phase for the loaded application. The internal timers of the logic run-time component 306 also continue to run. The standby CPU 202B must synchronize the logic data image and the logic run-time component timers (from UnitySync 402 messages received from main RTU 110A) while the application is in STOP, typically in the INTER phase. Similarly, on the standby RTU 110B, the INTER phase should write the logic run-time component 306 time counters and the logic data image. The initial standby sync process includes synchronization of the logic run-time component 306 time-counters, to be written every logic scan along with the logic data synchronization.

The redundant CPU pair checks the firmware version of the partner CPU via RCAP protocol information. The operational intention is that the same firmware image is operating on both CPUs 202A, 202B. A design decision for efficient mapping of data images from main to standby database records relies on the same image format on both sides, and therefore the same firmware version. A partner CPU cannot transition from Offline to Transfer mode if its firmware version differs from the main. An exception is when the CPU is in the middle of a rolling firmware upgrade, prior to entering Transfer mode. A "Rolling firmware upgrade" mechanism is provided in an embodiment to allow firmware updates remotely from the RTU site, while preserving configuration and data redundancy synchronization during the upgrade process.

The RED task 502 is responsible for coordinating the Redundancy State in each RTU CPU 202A, 202B according to the states presented through the RCAP protocol and the states presented by the logic sub-system. The RED task 502 is also responsible for the transfer and coordination of synchronization data between CPUs 202A, 202B for RTU systems (object database, RTU protocol events, time sync, configuration updates, firmware updates, logic application updates, logic data synchronization, etc.) making the decision to transition a logic application to RUN following transfer from standby CPU 202B to main CPU 202A, as shown in FIG. 5.

The UnitySync 402 sub-system, managed by the RED task 502, is responsible for keeping the logic data image updated between the CPUs 202A, 202B. In an embodiment, synchronization between RTU "RED" states and UnitySync states are the responsibility of the RED task 502. This ensures there is a single point of redundancy state decision making in the system. The RED task 502 analyzes the logic status through signaling from the logic run-time engine and through the HDEP protocol states and drives the logic redundancy interfaces to put the logic run-time into the correct operation state.

The UnitySync 402 mechanism is responsible for transferring:
 Logic warm context image (logic variable data+logic engine internal memory)—snapshot and transfer to standby CPU 202B after every main CPU 202A logic scan.
 Logic warm context image transfer continues even if the main CPU 202A logic is in a STOP state.
 Logic engine time/counter structure—snapshot and transfer to the standby CPU 202B after every main CPU 202A logic scan (accompanying the warm context image).
 Logic commands—detect and transfer to the standby CPU 202B upon change: Run/Stop/nit commands, putting a standby logic engine in an appropriate state so that a change-over of standby to main maintains (remembers) the logic in the same state as it was on the main CPU 202A.
 Logic RUN status of the main CPU 202A to be reflected on the standby CPU 202B, so LED and status indications are consistent when read independently from the standby CPU 202B (even though the logic on the standby CPU 202B is in STOP in preparation for switching to RUN upon transfer of standby to main).
 Logic readiness flag from the standby CPU 202B to the main CPU 202A. Where the standby CPU 202B is in a state such that it "does not want to be main", the standby CPU 202B needs to signal this to the main CPU 202A. At startup, this results in the standby indicating a FAILED condition to RCAP to prevent any changeover from main until a full resynchronization occurs In an embodiment, main CPU 202A propagates a system snapshot of full configuration, real-time data, event data and RTU logic application to standby partner CPU 202B, which is attempting to come online. The main CPU 202A accumulates real-time data changes occurring between the snapshot and the readiness of the partner CPU 202B to enter a standby state (the "synchronization phase"). The accumulated changes are sent to the standby CPU 202B, and when the change queue is empty on standby CPU 202B it transitions to the standby online state. Configuration changes occurring on main CPU 202A during synchronization phase are queued in the same way as real-time data changes. RTU configuration changes must be made to the main CPU 202A only. Configuration change attempts made to the standby CPU 202B is rejected. Real-time data and incremental configuration changes to RTU points are propagated from the main CPU 202A to the standby CPU 202B through copying database records. The granular unit of data change to the RTU database is at object record level, so it is efficient to transfer an entire record per data update. External changes to RTU system data are propagated from the main CPU 202A to the standby CPU 202B through "system data change" notifications. The granular unit of data change to RTU system data is at system data field level (i.e. system data value). For all objects replicated to the standby CPU 202B, the object ID on the standby is the object ID on the main. This ensures logic and other access to object ID values is identical after a CPU change-over.

The following are configuration items for the RTU 110 for redundancy communication management:

Ethernet 1 "CPU A" IP address/subnet mask (same as existing Ethernet 1 simplex configurations).

Ethernet 1 "CPU B" IP address (must be in the same subnet as Ethernet 1 "CPU A" IP address).

Ethernet 1 "Main" IP address (same subnet mask as Ethernet 1 "CPU A" subnet mask).

Ethernet 1 "Standby" IP address (must be in the same subnet as Ethernet 1 "Main" IP address).

Ethernet 3 "CPU A" IP address/subnet mask (same as Ethernet 3 simplex configuration).

Ethernet 3 "CPU B" IP address (must be in the same subnet as Ethernet 3 "CPU A" IP address).

Ethernet 3 "Main" IP address (same subnet mask as Ethernet 3 "CPU A" subnet mask).

Ethernet 3 "Standby" IP address (must be in the same subnet as Ethernet 3 "Main" IP address).

Ethernet 4 "CPU A" IP address/subnet mask (same as Ethernet 4 simplex configuration).

Ethernet 4 "CPU B" IP address (must be in the same subnet as Ethernet 4 "CPU A" IP address).

Ethernet 4 "Main" IP address (same subnet mask as Ethernet 4 "CPU A" subnet mask).

Ethernet 4 "Standby" IP address (must be in the same subnet as Ethernet 4 "Main" IP address).

Ethernet 2 is reserved exclusively for redundancy synchronization on a redundant RTU 110 and is not available to be configured for IP or any other user operation. Ethernet 2 configurations are not applicable. Serial3 is not available for general use on a redundant RTU 110 as it is dedicated as the RCAP redundancy state synchronization link. Serial3 configurations are not applicable in this embodiment. For each Ethernet channel, the appropriate "CPU x" IP address is applied to the channel according to the startup-up determination of whether the CPU is "A" or "B". Each channel may assume an additional IP address (Main IP or Standby IP), according to the redundancy state of the CPU. "CPU A" and "CPU B" IP addresses are mandatory for the channel if it is in use. The "CPU A", "CPU B", "Main" and "Standby" IP address must be unique. Main and Standby IP addresses are in the same subnet for the same Ethernet channel. CPU A and CPU B addresses may be in subnets independent from the Main/Standby IP addresses. A single subnet mask applies to all addresses on the interface.

In general, RTU Ethernet channels that provide server protocol support would normally provide a "Main" IP address so that external clients can reconnect to the RTU at a single IP address upon a standby-main processor changeover (e.g., remote protocols, local HMI, etc.). Ethernet channels that provide only client protocols don't necessarily need a "Main" IP address. The CPU-specific address may be used. The "Standby" IP address on each interface may be useful in specific diagnostic situations. "Main" and "Standby" addresses are optional, according to the use case for the Ethernet channel. For a redundant RTU 110 according to an embodiment, Ethernet 3 and Ethernet 4 interfaces are located on the application board. The application board is preferably configured from the main RTU processor firmware and is notified of main/standby transitions so that the interface IP addresses adjust as quickly as possible after a redundancy startup arbitration and change-over event. All Ethernet interfaces should initiate an ARP or similar requests to speed-up connection to external devices after IP address determination or change.

In an embodiment, firmware upgrades are performed under the following conditions:
i. User initiated (manual on a specific CPU in Simplex systems).
ii. User initiated (RTU Upgrade automatically deploys new firmware to a redundant pair of CPUs).
iii. Standby CPU replacement (standby firmware is automatically updated, possibly downgraded, from the main CPU).

The first condition (i) is completely under user control where the user manages redundancy transfer. The second condition (ii) deploys the following automatic sequence:
(a) The main CPU transfers the firmware image to standby (e.g., CPU A is main and CPU B is standby);
(b) The main instructs standby to update firmware (CPU A to CPU B in this example);
(c) As per the existing RTU upgrade process, the standby records database configuration+data to firmware version-independent file (e.g., on CPU B);
(d) The standby reboots and applies firmware upgrade (e.g., CPU B);
(e) The upgraded CPU restarts, loads configuration from file (e.g., CPU B);
(f) The upgraded CPU receives remaining synchronization from the main CPU (e.g., CPU B from CPU A);
(g) The upgraded CPU resumes standby state (e.g., CPU B);
(h) The main instructs the standby to switch to main state (CPU B becomes main CPU in this example);
(i) The main CPU switches to Offline state (e.g., CPU A);
(j) The standby CPU assumes the main state (e.g., CPU B);
(k) The offline CPU reboots and applies firmware upgrade (e.g., CPU A); and
(l) The upgraded CPU restarts, synchronizes and resumes standby state (e.g., CPU A);

Step (f) relies on an assumption that the newly upgraded firmware version on the standby CPU can easily receive compatible synchronization data from the firmware version of the main CPU. This is a key requirement for the redundancy design. Solutions to this scenario include a firmware version-independent format is available to exchange configuration and real time data and a refinement of the existing database representation and configuration process accounts for the special case of different firmware versions.

It was determined that a firmware version-independent format for configuration and real-time data exchange was inherently slow to complete both a bulk database replication and incremental replication at sync time. To overcome this, an all-configuration transfer must occur at the binary level between the two databases. That is, they must be identical database formats. As a firmware upgrade operating in the above sequence is a controlled and relatively fast process, the delta between the configuration recorded at step (c) and reloading at step (e) can be managed in the redundancy synchronization mechanism.

The following sub-process must occur as part of the sequence of steps (c) to (g):
Configuration updates are blocked on main CPU.
The main CPU captures serial number of standby CPU.
The standby database is captured through generating a configuration file (same as Step (c) above).
RED updates stop being passed to the standby CPU; instead are buffered on main CPU.
The standby firmware is updated (same as Step (d) above).
The standby database is restored from the configuration file on the standby (same as Step (e) above).
The main checks serial number of standby CPU is same, helping to ensure a valid upgrade sequence.

The standby enters a Transfer state, triggering RED updates (that were queued during the firmware upgrade) to be pushed to the standby (same as Step (f) above).

An empty RED queue on both main and standby nodes triggers completion of database synch allowing Unity application to synchronize (same as Step (g) above).

Configuration updates are unblocked (allowed) on the main CPU.

The third condition (iii—standby Replacement) describes an empty CPU replacing a previous standby, or is the first standby plugged in. It uses the following sequence:

(a) A new CPU starts and detects a main CPU in operation, enters an Offline state, sends RCAP messages to notify main it has started;

(b) If the main CPU determines the standby CPU firmware version is the same as the main then steps (c) to (g) are skipped;

(c) The main CPU transfers firmware image to standby (e.g., CPU A is active and CPU B is standby);

(d) The main instructs standby to update firmware (e.g., CPU A to B);

(e) The standby reboots and applies firmware upgrade (e.g., CPU B);

(f) The upgraded CPU restarts (e.g., CPU B);

(g) The main CPU checks the upgraded CPU firmware version, if different, tells the standby to go into an Error state, otherwise proceeds;

(h) The main CPU starts collecting delta updates of configuration and data (e.g., CPU A);

(i) The main CPU snapshots its database and event store (e.g., CPU A);

(j) The main CPU pushes snapshots to the standby CPU (e.g., CPU A to CPU B);

(k) The main CPU triggers synchronization of the runtime data synchronization sub-system for logic variable data (referred to as UnitySync) to start (e.g., CPU A);

(l) The upgraded CPU applies database and event store image (e.g., CPU B);

(m) The upgraded CPU enters a Transfer state (e.g., CPU B); and

The upgraded CPU waits for Unity synchronization and enters Online standby state (e.g., CPU B).

In an embodiment, a firmware update is automatically pushed as a file transfer across the HDEP protocol from the main CPU 202A to the standby CPU 202B. A successful file transfer response triggers an Activation command from the main to the partner CPU. Specific flags must be set in the Activation command sent from main CPU 202A to CPU 202B in order to trigger the replacement of the firmware in the offline partner CPU. This is necessary to enforce the checking and upgrade sequence specific to standby processor firmware replacement, differentiating it from a manually initiated firmware upgrade. Automatic firmware replacement may result in 'downgrade' of a firmware version (i.e., to an earlier version if the operating main has a lower firmware version number than the starting standby CPU 202B). Functionally this addresses, for redundant systems, end-user requirements for executing only qualified, approved firmware versions. If the main CPU 202A downgrades firmware in standby CPU 202B prior to it going into standby, the main CPU 202A should set an RTU status code so it is operationally obvious that this downgrade actually occurred.

The following TABLE I shows redundancy state and associated RTU actions according to an embodiment:

TABLE I

| RTU STATE | Transition Actions |
| --- | --- |
| START | Load database, check consistency |
| RESYNC | State on non-main CPU. Accepts data pushed from main to partner CPU for synchronization prior to entering standby online state (point database image, event store image, system data image, logic application). |
| SWITCHING | Take control from other CPU (standby to main transition when manual change-over is triggered) |
| MAIN | Start I/O Scanning, Execute logic, enable Logic outputs controlled from database, allow events to be generated and stored, if partner CPU is in RESYNC or STANDBY queue update changes |
| STANDBY | Logic synchronized, outputs not updating database, monitoring main CPU is alive, consuming queued update changes, ready to change to SWITCHING or MAIN state |
| OFFLINE | RTU detects a condition that makes it unsuitable to move toward standby state |

In an embodiment, the following are interactions between RTU and Logic redundancy states, as shown in TABLE II:

TABLE II

| Unity Logic STATES | Possible RTU redundancy state |
| --- | --- |
| INIT | START |
| | RESYNC |
| | MAIN (application manually initialized by user) |
| STOP | OFFLINE |
| | MAIN (application manually stop by user) |
| | STANDBY |
| RUN | MAIN with partner CPU |
| | MAIN without partner CPU |

Logic behavior when in the RTU redundancy states:

START—Logic state during initialization stage. From Cold start, through Configuration load, until first beginning of the user tasks.

OFFLINE—Default state. This is the state of the system when an RTU processor module can be neither a valid standby nor main. A redundant system would leave this state automatically if logic is running and all conditions required to be a valid standby are available again. The user may request a full synchronization to a partner in this state. Logic does not run on an Offline CPU. If this is the only CPU available, CPU transitions to MAIN and starts logic MAIN—The partner could be STANDBY or not present (standalone) or OFFLINE. Logic updates the RTU database. Logic runs all the sections of user code. On each scan, UnitySync sub-task checks the status of the partner.

STANDBY—The system reads internal data and database states from MAIN. Stand by logic is in STOP. UnitySync sub-task checks, on each scan, the status of the counterpart.

Embodiments of the present disclosure may comprise a special purpose computer including a variety of computer hardware, as described in greater detail herein.

For purposes of illustration, programs and other executable program components may be shown as discrete blocks. It is recognized, however, that such programs and components reside at various times in different storage components of a computing device, and are executed by a data processor (s) of the device.

Although described in connection with an example computing system environment, embodiments of the aspects of the invention are operational with other special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the example operating environment. Examples of computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the present disclosure may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the present disclosure may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments may be implemented with processor-executable instructions. The processor-executable instructions may be organized into one or more processor-executable components or modules on a tangible processor readable storage medium. Also, embodiments may be implemented with any number and organization of such components or modules. For example, aspects of the present disclosure are not limited to the specific processor-executable instructions or the specific components or modules illustrated in the figures and described herein. Other embodiments may include different processor-executable instructions or components having more or less functionality than illustrated and described herein.

The order of execution or performance of the operations in accordance with aspects of the present disclosure illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of the invention.

When introducing elements of the invention or embodiments thereof, the articles "a," "an," "the," and "said" are intended to mean that there are one or more of the elements. The terms "comprising," "including," and "having" are intended to be inclusive and mean that there may be additional elements other than the listed elements.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively, or in addition, a component may be implemented by several components.

The above description illustrates embodiments by way of example and not by way of limitation. This description enables one skilled in the art to make and use aspects of the invention, and describes several embodiments, adaptations, variations, alternatives and uses of the aspects of the invention, including what is presently believed to be the best mode of carrying out the aspects of the invention. Additionally, it is to be understood that the aspects of the invention are not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

It will be apparent that modifications and variations are possible without departing from the scope of the invention defined in the appended claims. As various changes could be made in the above constructions and methods without departing from the scope of the invention, it is intended that all matter contained in the above description and shown in the accompanying drawings shall be interpreted as illustrative and not in a limiting sense.

In view of the above, it will be seen that several advantages of the aspects of the invention are achieved and other advantageous results attained.

The Abstract and Summary are provided to help the reader quickly ascertain the nature of the technical disclosure. They are submitted with the understanding that they will not be used to interpret or limit the scope or meaning of the claims. The Summary is provided to introduce a selection of concepts in simplified form that are further described in the Detailed Description. The Summary is not intended to identify key features or essential features of the claimed subject matter, nor is it intended to be used as an aid in determining the claimed subject matter.

The invention claimed is:

1. A method for providing redundancy synchronization of remote terminal unit (RTU) central processing units (CPUs) associated with an industrial operation, comprising:
   initiating a redundancy management task to coordinate synchronization data between a standby RTU CPU and a main RTU CPU;
   queuing time-stamped events on the main RTU CPU as the time-stamped events are generated on the main RTU CPU;
   transferring the time-stamped events from the main RTU CPU to the standby RTU CPU;
   receiving the time-stamped events from the main RTU CPU on the standby RTU CPU;
   storing the time-stamped events received from the main RTU CPU in one or more standby RTU CPU event buffers;
   transmitting the time-stamped events from the main RTU CPU to a Supervisory Control and Data Acquisition (SCADA) controlling station, the transmission of the time-stamped events from the main RTU CPU configured to maintain an accessible record of the time-stamped events in the case of a subsequent transition from the standby RTU CPU to the main RTU CPU;

communicating receipt of the time-stamped events from the SCADA controlling station to the main RTU CPU; and upon confirming receipt of the time-stamped events from the SCADA controlling station, removing the time-stamped events in real-time from the main RTU CPU and from the one or more standby RTU CPU event buffers.

2. The method of claim 1, further comprising:
updating firmware on the standby RTU CPU to subsequently perform firmware updates on both the main RTU CPU and the standby RTU CPU.

3. The method of claim 2, wherein the main RTU CPU comprises a first RTU CPU and the standby RTU CPU having the updated firmware comprises a second RTU CPU, and further comprising:
performing a system change-over from the first RTU CPU to the second RTU CPU, wherein the second RTU CPU comprises the main RTU CPU and the first RTU CPU comprises the standby RTU CPU; and
thereafter updating the firmware on the first RTU CPU.

4. The method of claim 1, further comprising synchronizing logic state data images between the main RTU CPU and the standby RTU CPU.

5. The method of claim 4, wherein synchronizing the logic state data images comprises:
compressing the logic state data images on the main RTU CPU and transferring the compressed logic state data images from the main RTU CPU to the standby RTU CPU;
receiving the compressed logic state data images at the standby RTU CPU; and
decompressing the compressed logic state data images.

6. The method of claim 5, further comprising:
deploying, by the standby RTU CPU, the decompressed logic state data images.

7. The method of claim 6, wherein deploying the decompressed logic state data images includes synchronizing decompressed logic state data images with at least one of other data and event updates from the main RTU CPU, and wherein the standby RTU CPU is configured to activate with an updated logic state data image including the logic state data images, synchronized with the other data and the event updates, within the timing of one logic scan of the main RTU CPU.

8. The method of claim 4, wherein synchronizing the logic state data images between the main RTU CPU and the standby RTU CPU the occurs using an Ethernet sub network access protocol frame transfer.

9. The method of claim 1, wherein queuing the time-stamped events on the main RTU CPU occurs in real-time.

10. A system for providing redundancy synchronization of remote terminal unit (RTU) central processing units (CPUs) associated with an industrial operation, comprising:
a standby RTU CPU; and
a main RTU CPU;
wherein the standby RTU CPU and the main RTU CPU are configured to initiate a redundancy management task to coordinate the transfer of synchronization data;
wherein the main RTU CPU executes processor-executable instructions that, when executed, configure the main RTU CPU to:
generate a plurality of time-stamped events,
queue the time-stamped events in a main queue as the time-stamped events are generated, and
transfer the time-stamped events from the main queue to the standby RTU CPU;

wherein the standby RTU CPU executes processor-executable instructions that, when executed, configure the standby RTU CPU to:
receive the time-stamped events from the main RTU CPU, and
store the time-stamped events received from the main RTU CPU in one or more standby RTU CPU event buffers;
wherein the main RTU CPU executes processor-executable instructions that, when executed, further configure the main RTU CPU to:
transmit the time-stamped events to a Supervisory Control and Data Acquisition (SCADA) controlling station, the transmission of the time-stamped events from the main RTU CPU configured to maintain accessible record of the time stamped events in the case of a subsequent transition from the standby RTU CPU to the main RTU CPU, and
receive, from the SCADA controlling station, communication of receipt of the time-stamped events by the SCADA controlling station; and
wherein the time-stamped events are removed in real-time from the main RTU CPU and from the one or more standby RTU CPU event buffers upon communication of receipt of the time-stamped events from the SCADA controlling station receiving the transmitted time-stamped events.

11. The system of claim 10, wherein the standby RTU CPU executes processor-executable instructions that, when executed, further configure the standby RTU CPU to update firmware thereon to subsequently perform firmware updates on both the main RTU CPU and the standby RTU CPU.

12. The system of claim 11, wherein the main RTU CPU comprises a first RTU CPU and the standby RTU CPU having the updated firmware comprises a second RTU CPU, and wherein the first RTU CPU and the second RTU CPU are swapped such that the second RTU CPU having the updated firmware comprises the main RTU CPU and the first RTU CPU comprises the standby RTU CPU.

13. The system of claim 10, wherein logic state data images are synchronized between the main RTU CPU and the standby RTU CPU.

14. The system of claim 13:
wherein the main RTU CPU executes processor-executable instructions that, when executed, further configure the main RTU CPU to:
compress the logic state data images on the main RTU CPU, and
transfer the compressed logic state data images from the main RTU CPU to the standby RTU CPU;
wherein the standby RTU CPU executes processor-executable instructions that, when executed, further configure the standby RTU CPU to:
receive the compressed logic state data images at the standby RTU CPU, and
decompress the compressed logic state data images, and
deploy the decompressed logic state data images.

15. The system of claim 14, wherein the deployed decompressed logic state data images are synchronized with at least one of other data and event updates from the main RTU CPU, and wherein the standby RTU CPU is further configured to activate with an updated logic state data image including the logic state data images, synchronized with the other data and the event updates, within the timing of one logic scan of the main RTU CPU.

16. The system of claim 13, further comprising an Ethernet sub network access protocol frame transfer by which the logic state data images are synchronized between the main RTU CPU and the standby RTU CPU.

17. The system of claim 10, wherein the time-stamped events are queued on the main RTU CPU in real-time.

18. A system associated with an industrial operation, comprising:
- a Supervisory Control and Data Acquisition (SCADA) controlling station;
- a standby remote terminal unit (RTU) communicatively coupled to the SCADA controlling station, the standby RTU having a standby central processing unit (CPU); and
- a main RTU communicatively coupled to the SCADA controlling station, the main RTU having a main CPU;
- wherein the standby RTU CPU and the main RTU CPU are configured to initiate a redundancy management task to coordinate the transfer of synchronization data;
- wherein the main RTU CPU executes processor-executable instructions that, when executed, configure the main RTU CPU to:
  - generate a plurality of time-stamped events,
  - queue the time-stamped events in a main queue as the time-stamped events are generated, and
  - transfer the time-stamped events from the main queue to the standby RTU CPU;
- wherein the standby RTU CPU executes processor-executable instructions that, when executed, configure the standby RTU CPU to:
  - receive the time-stamped events from the main RTU CPU, and
  - store the time-stamped events received from the main RTU CPU in one or more standby RTU CPU event buffers;
- wherein the main RTU CPU executes processor-executable instructions that, when executed, further configure the main RTU CPU to:
  - transmit the time-stamped events to the SCADA controlling station, the transmission of the time-stamped events from the main RTU CPU configured to maintain accessible record of the time stamped events in the case of a subsequent transition from the standby RTU CPU to the main RTU CPU, and
  - receive, from the SCADA controlling station, communication of receipt of the time-stamped events by the SCADA controlling station; and
- wherein the time-stamped events are removed in real-time from the main RTU CPU and from the one or more standby RTU CPU event buffers upon communication of receipt of the time-stamped events from the SCADA controlling station receiving the transmitted time-stamped events.

19. The system of claim 18, wherein the standby RTU CPU executes processor-executable instructions that, when executed, further configure the standby RTU CPU to update firmware thereon to subsequently perform firmware updates on both the main RTU CPU and the standby RTU CPU, wherein the main RTU CPU comprises a first RTU CPU and the standby RTU CPU having the updated firmware comprises a second RTU CPU, and wherein the first RTU CPU and the second RTU CPU are swapped such that the second RTU CPU having the updated firmware comprises the main RTU CPU and the first RTU CPU comprises the standby RTU CPU.

20. The system of claim 18, wherein logic state data images are synchronized between the main RTU CPU and the standby RTU CPU.

* * * * *